(12) United States Patent
Tateno

(10) Patent No.: US 10,309,293 B2
(45) Date of Patent: Jun. 4, 2019

(54) INTERNAL COMBUSTION ENGINE

(71) Applicant: TOYOTA JIDOSHA KABUSHIKI KAISHA, Toyota-shi, Aichi-ken (JP)

(72) Inventor: Manabu Tateno, Suntou-gun (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 68 days.

(21) Appl. No.: 15/506,971

(22) PCT Filed: Aug. 11, 2015

(86) PCT No.: PCT/JP2015/004026
§ 371 (c)(1),
(2) Date: Feb. 27, 2017

(87) PCT Pub. No.: WO2016/056161
PCT Pub. Date: Apr. 14, 2016

(65) Prior Publication Data
US 2017/0284281 A1  Oct. 5, 2017

(30) Foreign Application Priority Data
Oct. 7, 2014 (JP) ................. 2014-206331

(51) Int. Cl.
*F02F 7/00* (2006.01)
*F02B 23/06* (2006.01)
(Continued)

(52) U.S. Cl.
CPC ........ *F02B 23/0603* (2013.01); *F02B 23/101* (2013.01); *F02F 1/24* (2013.01);
(Continued)

(58) Field of Classification Search
CPC ............. F02B 23/0603; F02B 23/101; F02B 2023/0612; F02F 1/24; F02F 2001/249; F05C 2253/12; Y02T 10/125
(Continued)

(56) References Cited

U.S. PATENT DOCUMENTS 4,738,227 A * 4/1988 Kamo ................ F02B 9/04
123/23
4,796,572 A * 1/1989 Heydrich ............ F01P 9/00
123/193.2
(Continued)

FOREIGN PATENT DOCUMENTS

| JP | S62-063124 | 3/1987 |
| JP | 2007-032310 | 2/2007 |

(Continued)

*Primary Examiner* — Marguerite J McMahon
(74) *Attorney, Agent, or Firm* — Finnegan, Henderson, Farabow, Garrett & Dunner, LLP

(57) ABSTRACT

A thermal insulation film is formed on a bottom surface of a cylinder head facing a top surface of a piston. The thermal insulation film in a region (a circumferential region) of a bottom surface of the cylinder head configuring a squish area in a circumferential edge of a cavity region is formed to be thinner than the thermal insulation film in a region (a cavity region) of the bottom surface of the cylinder head facing a cavity. The thermal insulation film in the circumferential region is polished, and surface roughness thereof is equal to or lower than 3 μm. The thermal insulation film in the cavity region is not polished, and surface roughness thereof is 3 to 8 μm on average.

5 Claims, 5 Drawing Sheets

(51) Int. Cl.
*F02F 1/24* (2006.01)
*F02B 23/10* (2006.01)

(52) U.S. Cl.
CPC . *F02B 2023/0612* (2013.01); *F02B 2023/102* (2013.01); *F02F 2001/249* (2013.01); *F05C 2253/12* (2013.01); *Y02T 10/125* (2013.01)

(58) Field of Classification Search
USPC ............. 123/668, 193.2, 193.6, 193.5; 29/888.045, 888.061
See application file for complete search history.

(56) References Cited

U.S. PATENT DOCUMENTS

| | | | | |
|---|---|---|---|---|
| 4,852,542 A | * | 8/1989 | Kamo | F02B 77/02 123/668 |
| 5,477,820 A | * | 12/1995 | Rao | F02B 77/11 123/193.2 |
| 5,560,331 A | * | 10/1996 | Komatsu | F02F 1/4264 123/193.5 |
| 2013/0255651 A1 | * | 10/2013 | Nomura | F02B 23/00 123/668 |
| 2016/0273484 A1 | | 9/2016 | Tateno et al. | |

FOREIGN PATENT DOCUMENTS

| | | |
|---|---|---|
| JP | 2012-159059 | 8/2012 |
| JP | 2013-194560 | 9/2013 |
| JP | 2014-20301 | 2/2014 |
| JP | 2015-94292 | 5/2015 |
| WO | WO 2013/161529 A1 | 10/2013 |

* cited by examiner

[Fig. 1]
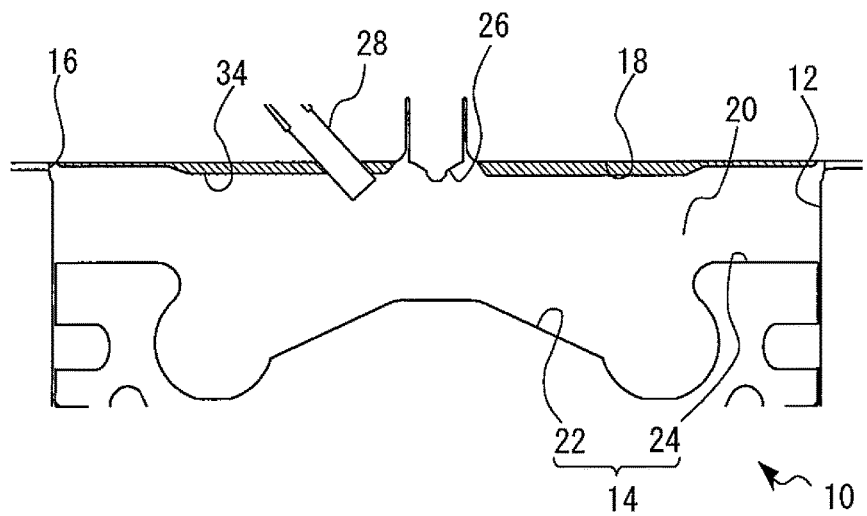
[Fig. 2]
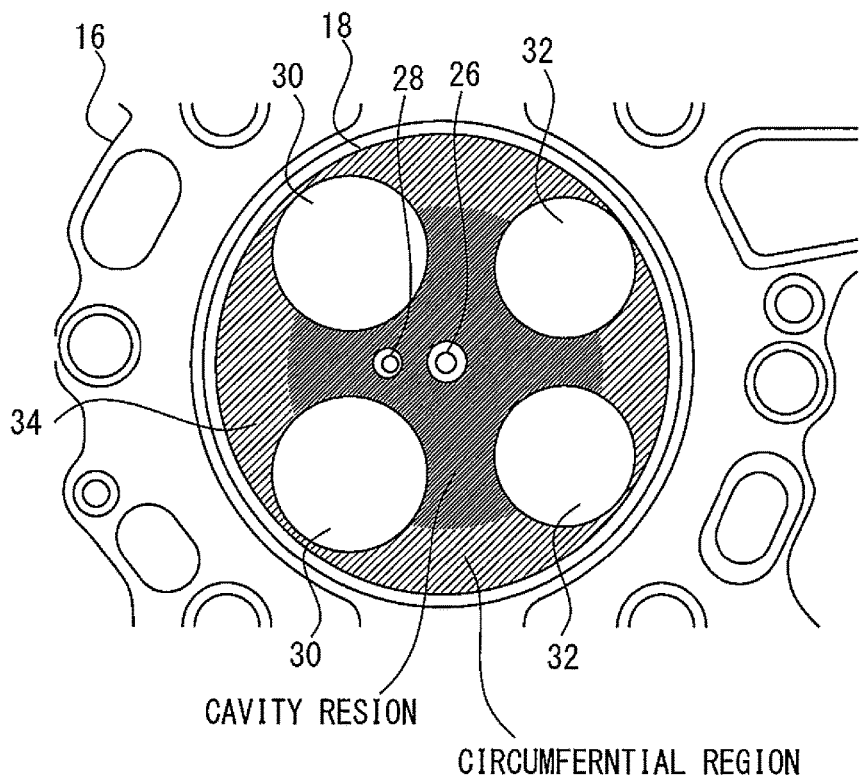
CAVITY RESION
CIRCUMFERNTIAL REGION

[Fig. 3]
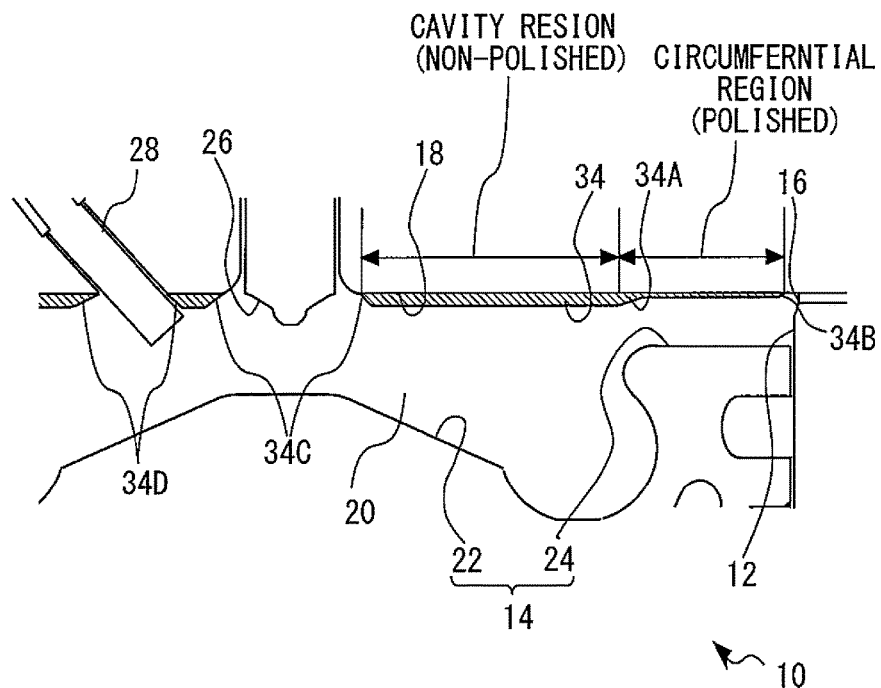
[Fig. 4]
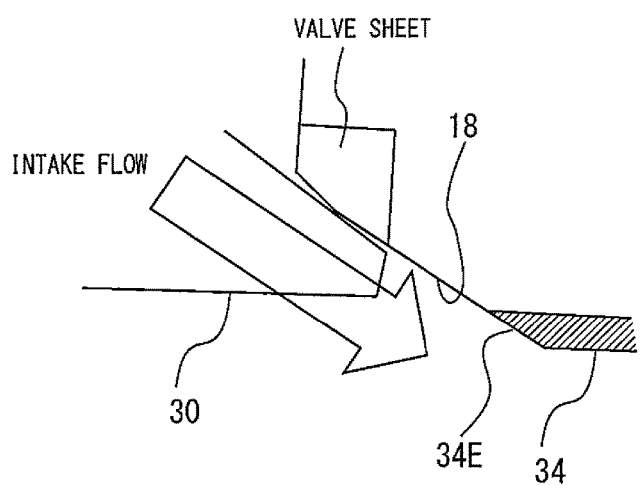

[Fig. 5]
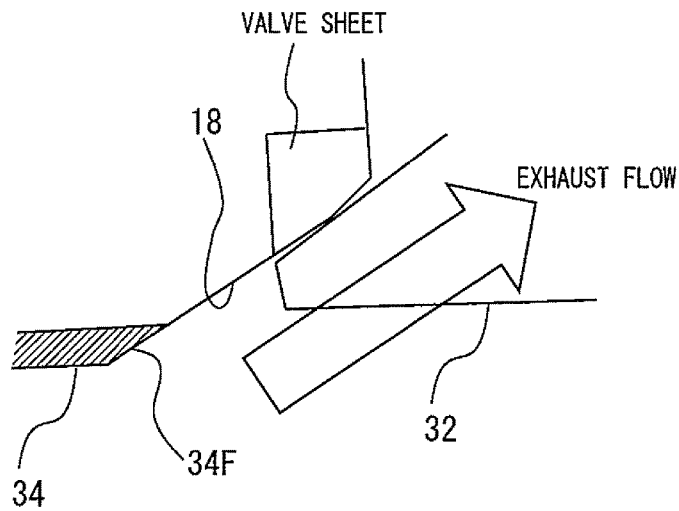
[Fig. 6]
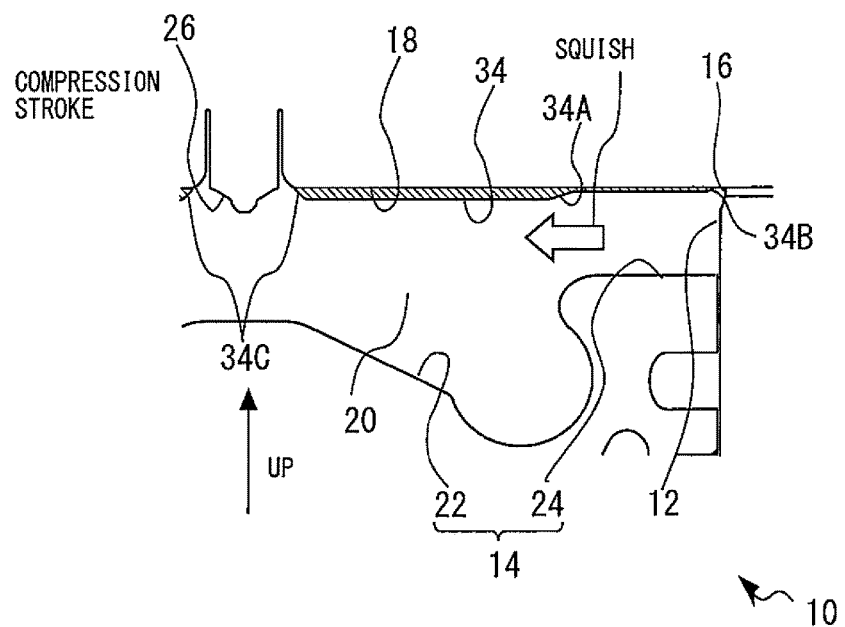

[Fig. 7]
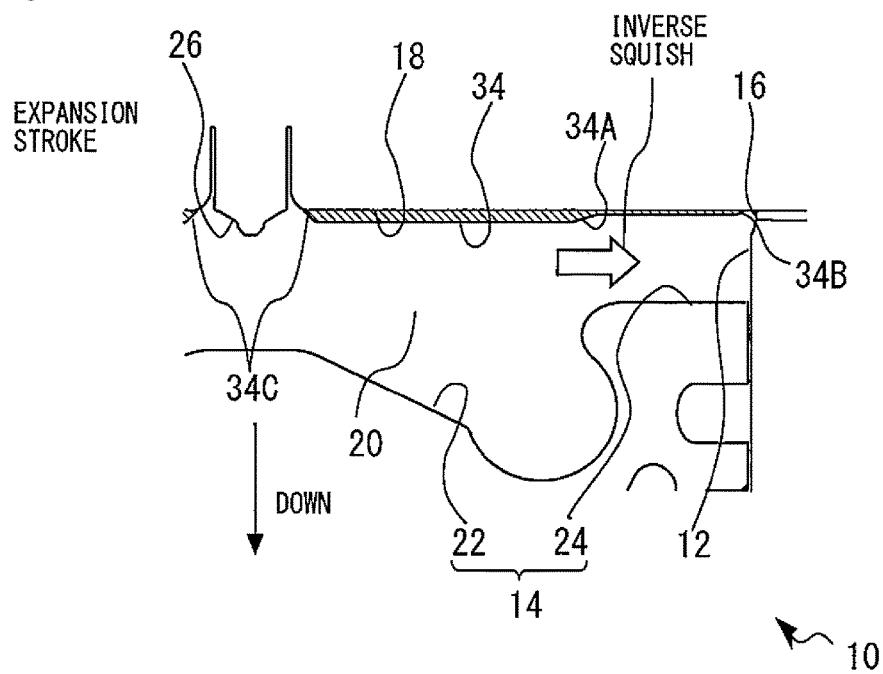
[Fig. 8]
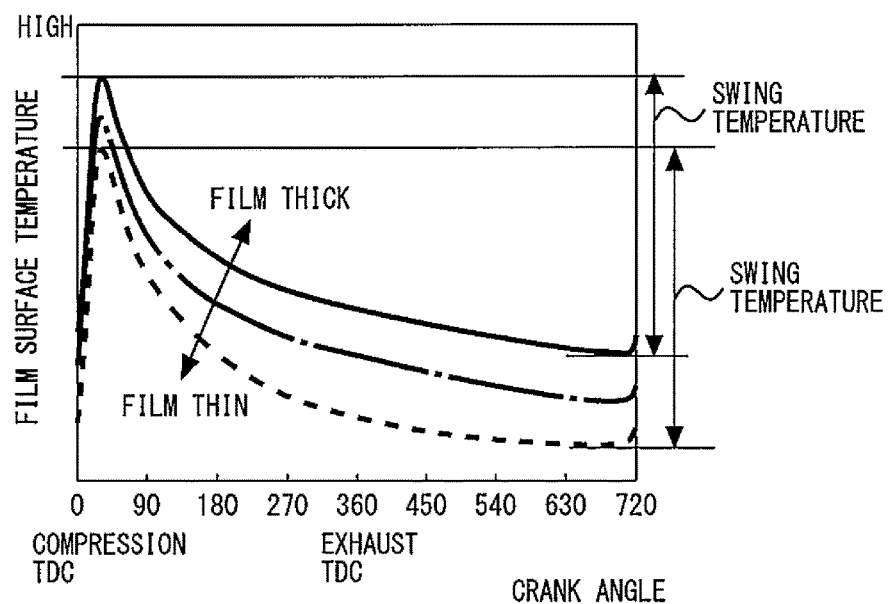

[Fig. 9]
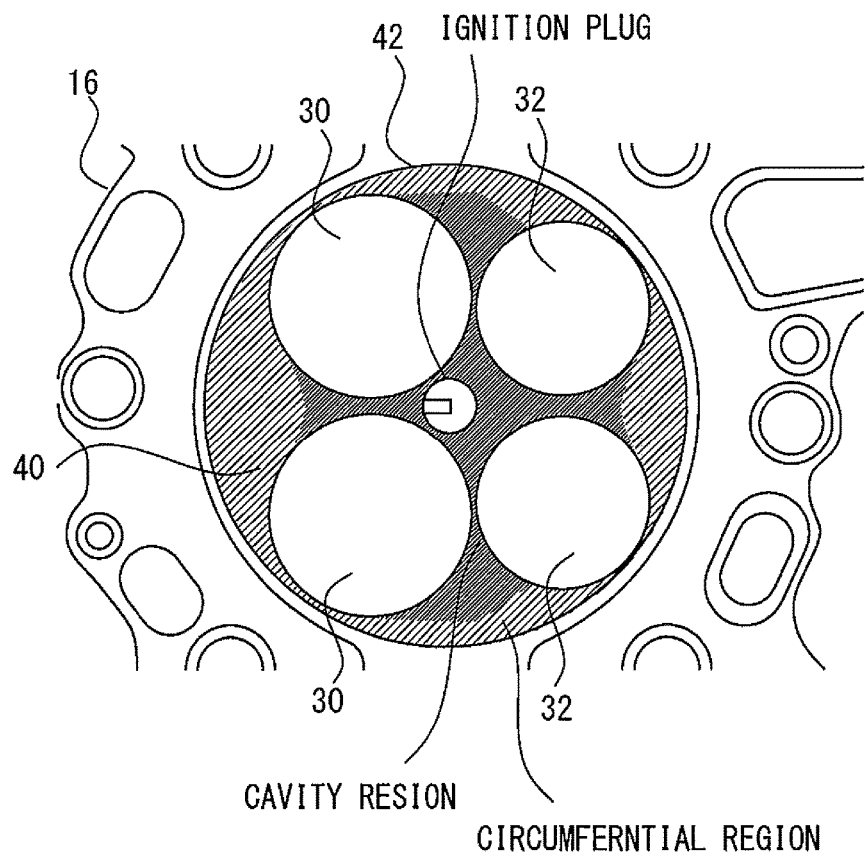
CAVITY RESION
CIRCUMFERNTIAL REGION
[Fig. 10]
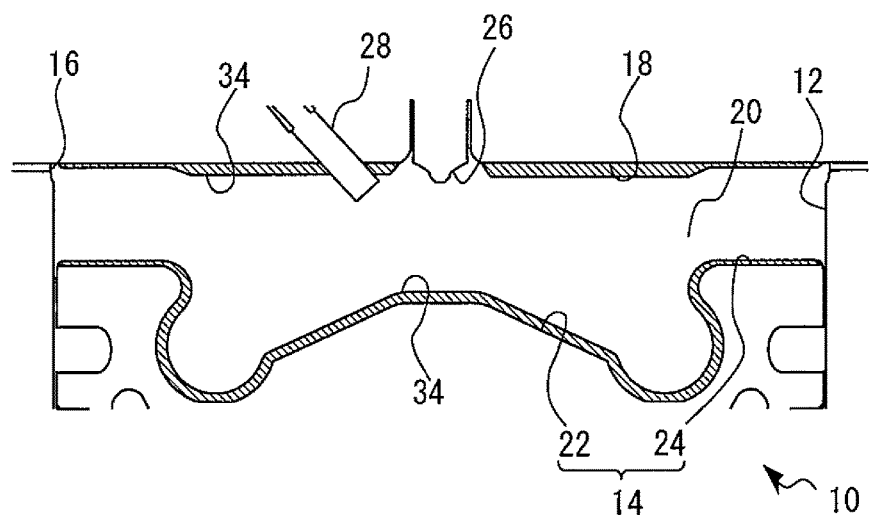

INTERNAL COMBUSTION ENGINE

CROSS-REFERENCE TO RELATED APPLICATIONS

This application is a national phase application of International Application No. PCT/JP2015/004026, filed Aug. 11, 2015, and claims the priority of Japanese Application No. 2014-206331, filed Oct. 7, 2014, the content of both of which is incorporated herein by reference.

TECHNICAL FIELD

The present invention relates to an internal combustion engine, and more particularly relates to an internal combustion engine in which a heat insulation film is formed on a bottom surface of a cylinder head thereof.

BACKGROUND ART

Conventionally, for example, Japanese Patent Laid-Open No. 2012-159059 discloses a spark-ignition type engine in which the anodized aluminum coating film is formed on the bottom surface of the cylinder head configuring the combustion chamber, wherein the film thickness of an anodized aluminum coating film is configured to be thinner or the roughness of the surface of the anodized aluminum coating film is configured to be larger, with increasing distance from the center portion of the cylinder head with which an ignition plug is provided. An anodized aluminum coating film has a lower thermal conductivity as compared with the base material (an aluminum alloy) of the cylinder head, and functions as a thermal insulation film with a low thermal capacity per unit volume. By making the film thickness of the anodized aluminum coating film and the roughness of the surface thereof as described above, heat accumulation can be re-strained by reducing the thermal insulating property in the spot away from the ignition plug, and therefore, resistance to knocking which easily occurs in the spot can be enhanced.

CITATION LIST

Patent Literature

PTL 1: Japanese Patent Laid-Open No. 2012-159059

SUMMARY OF INVENTION

Technical Problem

The reason why the surface roughness of the anodized aluminum coating film is made large in the aforementioned engine is to enhance heat radiation performance in the spot away from the ignition plug by enlarging the heat transmission area of the anodized aluminum coating film. However, in the engine having a squish area in which a mixture gas is crushed as the piston rises, there arises the problem that when the surface roughness of the bottom surface of the cylinder head configuring the squish area is large, flowability of the mixture gas which is pushed out from the squish area at the time of rise of the piston reduces, and combustibility is reduced.

The invention is made to solve the problem as described above, and an object of the invention is to restrain reduction of flowability of a mixture gas that is pushed out of a squish area at a time of rise of a piston, in an internal combustion engine in which a thermal insulation film is formed on a bottom surface of a cylinder head that configures a combustion chamber.

Solution to Problem

A first invention is a n internal combustion engine including a top surface of a piston, on which a cavity is formed, and a bottom surface of a cylinder head that configures a combustion chamber together with the top surface, and has a thermal insulation film, which has a lower thermal conductivity and a lower thermal capacity per unit volume than a base material, formed thereon, wherein in the bottom surface of the cylinder head which configures the combustion chamber, surface roughness of the thermal insulation film in a circumferential region that configures a squish area in a circumferential edge of a cavity region is formed to be smaller than surface roughness of the thermal insulation film in the cavity region facing the cavity.

A second invention is the internal combustion engine according to the first invention, wherein a film thickness of the thermal insulation film in the circumferential region is formed to be thinner than a film thickness of the thermal insulation film in the cavity region.

A third invention is the internal combustion engine according to first or second invention, wherein the film thickness of the thermal insulation film in the circumferential region is formed to change continuously in a connection portion with the cavity region, and become thinner with increasing distance from the cavity region.

A fourth invention is the internal combustion engine according to any one of the first to the third inventions, wherein on the top surface of the piston, a thermal insulation film that has a lower thermal conductivity and a lower thermal capacity per unit volume than a piston base material is formed, and surface roughness of the thermal insulation film in the top surface of the piston is formed to be equivalent to surface roughness of the thermal insulation film in the circumferential region.

A fifth invention is the internal combustion engine according to the fourth invention, wherein a film thickness of the thermal insulation film in a circumferential edge of the cavity is formed to be thinner than a film thickness of the thermal insulation film in the cavity.

Advantageous Effect of Invention

According to the first invention, the surface roughness of the thermal insulation film in the circumferential region is formed to be smaller than the surface roughness of the thermal insulation film in the cavity region, and therefore, the flowability of the mixture gas in the circumferential region can be enhanced, as compared with the case in which the surface roughness of the thermal insulation film in the circumferential region is formed to be larger than the surface roughness of the thermal insulation film in the cavity region. Accordingly, reduction of combustibility accompanying reduction of flowability of the mixture gas at the time of rise of the piston can be restrained. Further, according to the first invention, the surface roughness of the thermal insulation film in the circumferential region can be formed to be larger than the surface roughness of the thermal insulation film in the cavity region. Accordingly, a disturbance is caused to the mixture gas which moves to the cavity region from the circumferential region at the time of rise of the piston, and further mixing of the intake air and the fuel which form the mixture gas can be promoted. Further, the temperature of the thermal insulation film can be also increased in a short time at the time of combustion of the fuel. Accordingly, at the time of cold start in which most of the combustion gas contacts the cavity region, the thermal insulation film in the cavity region is warmed early and ignitability of the mixture gas can be enhanced.

If the thermal insulation film is formed to be thick, the thermal insulating property of the combustion chamber is enhanced, but the gas temperature in the combustion chamber becomes difficult to reduce. In this regard, according to the second invention, the film thickness of the thermal insulation film in the circumferential region is formed to be thinner than the film thickness of the thermal insulation film in the cavity region, and therefore, the gas temperature in the combustion chamber can be restrained from being increased excessively by the relatively thin thermal insulation film which is formed in the circumferential region in the intake stroke, while the thermal insulating property of the combustion chamber is enhanced by the relatively thick thermal insulation film which is formed in the cavity region at the time of generation of a flame.

According to the third invention, the film thickness of the thermal insulation film in the circumferential region is formed to be thinner with increasing distance from the cavity region, in the connection portion with the cavity region, and therefore, flowability of the mixture gas can be restrained from being reduced in the connection portion.

According to the fourth invention, the thermal insulation film is formed on the top surface of the piston in addition to the bottom surface of the cylinder head, and the surface roughness of the thermal insulation film on the top surface is formed to be equivalent to the surface roughness of the thermal insulation film in the circumferential region. Therefore, flowability of the mixture gas in the top surface of the piston can be enhanced as compared to the case in which the surface roughness of the thermal insulation film on the top surface of the piston is made equivalent to the surface roughness of the thermal insulation film in the cavity region.

According to the fifth invention, the thermal insulation film is formed on the top surface of the piston, and the film thickness of the thermal insulation film in the circumferential edge of the cavity is formed to be thinner than the film thickness of the thermal insulation film in the cavity. Therefore, the gas temperature in the combustion chamber can be restrained from being excessively increased, by the relatively thin thermal insulation film which is formed in the circumferential region in the intake stroke, while the thermal insulating property of the combustion chamber is enhanced by the relatively thick thermal insulation film which is formed in the cavity at the time of generation of a flame.

BRIEF DESCRIPTION OF DRAWINGS

FIG. 1 is a schematic vertical sectional view of a combustion chamber of an internal combustion engine of Embodiment 1.

FIG. 2 is a view of the bottom surface of the cylinder head 18 seen from the top surface side of the piston 14.

FIG. 3 is a partially enlarged view of FIG. 1.

FIG. 4 is a partially enlarged view of the cylinder head 18 in a vicinity of an umbrella-shaped portion of the intake valve 30.

FIG. 5 is a partially enlarged view of the cylinder head 18 in a vicinity of an umbrella-shaped portion of the exhaust valve 32.

FIG. 6 is a view for describing an effect according to Embodiment 1.

FIG. 7 is a view for describing an effect according to Embodiment 1.

FIG. 8 is a diagram showing a relation between a surface temperature and a film thickness of the anodized aluminum coating film which is formed on the combustion chamber wall surface.

FIG. 9 is a view of a bottom surface of a cylinder head of a spark-ignition type engine seen from a top surface side of a piston.

FIG. 10 is a schematic vertical sectional view of a combustion chamber of an internal combustion engine of Embodiment 2.

DESCRIPTION OF EMBODIMENTS

Hereinafter, embodiments of the present invention will be described based on the drawings. Note that common elements in the respective drawings are assigned with the same reference signs, and redundant explanation will be omitted. Further, the present invention is not limited by the following embodiments.

Embodiment 1

First, Embodiment 1 of the present invention will be described with reference to FIG. 1 to FIG. 9.

FIG. 1 is a schematic vertical sectional view of a combustion chamber of an internal combustion engine of Embodiment 1. An internal combustion engine 10 shown in FIG. 1 is a compression ignition type engine (a diesel engine) which is mounted on a movable body such as a vehicle. As shown in FIG. 1, the internal combustion engine 10 includes a cylinder 12 that is formed in a cylinder block (not illustrated), a piston 14 that is accommodated to be slidable in a vertical direction in the cylinder 12, and a cylinder head 18 that is mounted above the cylinder block via a gasket 16.

A space sandwiched by a top surface of the piston 14 and a bottom surface of the cylinder head 18 forms a combustion chamber 20. A cavity 22 formed of a substantially cylindrical recess is formed in a center portion of the top surface of the piston 14, and the cavity 22 also configures a part of the combustion chamber 20. Further, a space sandwiched by an inner wall surface of the cylinder 12, a circumferential edge portion 24 (a region where the cavity 22 is not formed in the top surface of the piston 14) of the top surface of the piston 14, and the bottom surface of the cylinder head 18, which faces the circumferential edge portion 24.

A fuel injection valve 26 that injects fuel to the combustion chamber 20, and a glow plug 28 that functions as a starting aid for the internal combustion engine 10 are mounted to the cylinder head 18. FIG. 2 is a view of the bottom surface of the cylinder head 18 seen from the top surface side of the piston 14. The fuel injection valve 26 is provided in a substantially central portion of the cylinder head 18, and the glow plug 28 is provided in a vicinity of the fuel injection valve 26. Further, an intake valve 30 that opens and closes an intake port (not illustrated) from which air is introduced into the combustion chamber 20, and an exhaust valve 32 that opens and closes an exhaust port (not illustrated) from which an exhaust gas is discharged from the combustion chamber 20 are provided in the cylinder head 18.

As shown in FIG. 1 and FIG. 2, a thermal insulation film 34 is formed on the bottom surface of the cylinder head 18 that faces the top surface of the piston 14. The thermal insulation film 34 is formed from an anodized aluminum coating film. The anodized aluminum coating film is obtained by anodic oxidation treatment of a base material (an aluminum alloy) of the cylinder head 18, and has an infinite number of pores formed in a process of the anodic oxidation treatment. By having a porous structure like this, the anodized aluminum coating film has a lower thermal conductivity than the base material, and functions as a thermal insulation film that has a low thermal capacity per unit volume. A sealing film that closes the pores may be formed on the surface of the anodized aluminum coating film.

A film thickness of the thermal insulation film 34 which is formed on the bottom surface of the cylinder head 18 is not constant. That is to say, the thermal insulation film 34 in a region (hereinafter, called "a circumferential region") of the bottom surface of the cylinder head 18 which configures a squish area in a circumferential edge of the cavity region is formed to be thinner than the thermal insulation film 34 in the region (hereinafter, called "a cavity region" of the bottom surface of the cylinder head 18, which faces the cavity 22. The reason of this is that the circumferential region is polished for the purpose of enhancing (smoothening) surface roughness (referring to the arithmetic mean roughness that is measured in conformity with JIS B601 (2001). Hereinafter the same), after the anodized aluminum coating film is formed on the bottom surface of the cylinder head 18. The surface roughness of the thermal insulation film 34 which is formed on the circumferential region is equal to or smaller than 3 µm. The cavity region is not polished, and the surface roughness of the thermal insulation film 34 which is formed in the cavity region is 3 to 8 µm on average.

FIG. 3 is a partially enlarged view of FIG. 1. As shown in FIG. 3, a film thickness of the thermal insulation film 34 which is formed on the circumferential region is uniform throughout a substantially entire range of the circumferential edge portion (50 to 150 µm). However, the film thickness of the the thermal insulation film 34 which is formed in the circumferential region continuously changes in a connection portion 34A with the cavity region and an end portion 34B in a vicinity of the cylinder 12, and becomes thinner with increasing distance from the cavity region. Likewise, the film thickness of the thermal insulation film 34 which is formed in the cavity region is uniform throughout a substantially entire range of the cavity region (150 to 250 µm). However, the film thickness of the thermal insulation film 34 which is formed in the cavity region continuously changes in an end portion 34C in a vicinity of the fuel injection valve 26 and an end portion 34D in a vicinity of the glow plug 28, and becomes thinner toward the fuel injection valve 26 and the glow plug 28.

FIG. 4 is a partially enlarged view of the cylinder head 18 in a vicinity of an umbrella-shaped portion of the intake valve 30. FIG. 5 is a partially enlarged view of the cylinder head 18 in a vicinity of an umbrella-shaped portion of the exhaust valve 32. As shown in FIG. 4 and FIG. 5, the film thickness of the thermal insulation film 34 continuously decreases in an end portion 34E in the vicinity of the umbrella-shaped portion of the intake valve 30 and an end portion 34F in the vicinity of the umbrella-shaped portion of the exhaust valve 32, and becomes thinner toward the intake valve 30 and the exhaust valve 32. The thermal insulation film 34 surrounding the intake valve 30 and the exhaust valve 32 is across both the cavity region and the circumferential region (see FIG. 2), and therefore, the thermal insulation film 34 shown in FIG. 4 and FIG. 5 means both the thermal insulation film 34 which is formed in the cavity region and the thermal insulation film 34 which is formed in the circumferential region.

The film thickness of the thermal insulation film 34 in the connection portion 34A and the end portions 34B to 34F explained with FIG. 3 to FIG. 5 is changed by polishing the anodized aluminum coating film in these sites similarly to the anodized aluminum coating film in the circumferential region.

Referring to FIG. 6 to FIG. 8, an effect according to Embodiment 1 will be described. As shown in FIG. 6, in a compression stroke of the internal combustion engine 10, the piston 14 rises and squish occurs, in which a mixture gas is pushed out of the circumferential edge portion 24 to the cavity 22. In Embodiment 1, the surface of the thermal insulation film 34 in the circumferential region is formed to be smooth by polishing, and therefore, flowability of the mixture gas can be enhanced by enhancing a squish flow velocity as compared with the case in which the surface is not polished. Further, the film thickness of the thermal insulation film 34 in the connection portion 34A is continuously changed, and therefore, the flowability of the mixture gas can be restrained from being inhibited in the connection portion 34A. Therefore, reduction in combustibility accompanying reduction in flowability of the mixture gas can be restrained.

Further, in Embodiment 1, the cavity region is not polished, and therefore, the surface roughness of the thermal insulation film 34 which is formed in the cavity region remains to be large. Accordingly, a disturbance is caused to the mixture gas which moves to the cavity region from the circumferential region at the time of rise of the piston 14, and further mixing of intake air and fuel which form the mixture gas can be promoted. Further, the surface roughness of the thermal insulation film 34 which is formed in the cavity region remains to be large, and therefore, a temperature thereof can be also increased in a short time. Accordingly, at a time of cold start of the internal combustion engine 10 when most of the combustion gas contacts the cavity region, the thermal insulation film in the cavity region is warmed early, and ignitability of the mixture gas can be enhanced.

Further, as shown in FIG. 7, in an expansion stroke of the internal combustion engine 10, the piston 14 descends, and inverse squish in which a flame is drawn into the circumferential edge portion 24 from the cavity 22 occurs. In Embodiment 1, the surface of the thermal insulation film 34 in the circumferential region is formed to be smooth by polishing, and therefore, flowability of the flame can be enhanced by enhancing an inverse squish flow velocity as compared with the case in which the surface is not polished. Further, the film thickness of the thermal insulation film 34 in the connection portion 34A is continuously changed, and therefore, the flowability of the flame can be restrained from being reduced in the connection portion 34A. Therefore, reduction of the combustion efficiency accompanying reduction in flowability of the flame can be restrained.

Further, in Embodiment 1, the film thickness of the thermal insulation film 34 in the end portions 34B to 34F is continuously changed, and therefore, occurrence of unburned fuel in the end portions 34B to 34F can be also restrained.

Further, in Embodiment 1, the film thickness of the thermal insulation film 34 differs in the cavity region and the circumferential region, and therefore, the effect as follows can be expected. FIG. 8 is a diagram showing a relation between a surface temperature and a film thickness of the anodized aluminum coating film which is formed on the combustion chamber wall surface. As shown in FIG. 8, the surface temperature of the anodized aluminum coating film abruptly rises in a vicinity of a compression TDC in which a flame is generated and reaches a maximum temperature, and thereafter the surface temperature lowers. The maximum temperature becomes higher as the anodized aluminum coating film becomes thicker, and therefore, when attention is paid to a thermal insulating property, the anodized aluminum coating film is desirably made thick. However, as a swing temperature (a difference between a maximum value and a minimum value of the gas temperature in the combustion chamber) is larger, a swing characteristic (referred to the characteristic that the temperature of the coating film follows the gas temperature in the combustion chamber. Hereinafter the same) becomes higher. Therefore, it is understandable that when attention is paid to the swing characteristic, it is not sufficient to simply make the anodized aluminum coating film thick.

In this regard, in Embodiment 1, the thermal insulation film 34 in the cavity region is formed to be thick. Therefore, the temperature of the combustion gas is sufficiently increased by the thick thermal insulation film 34 which configures most of the combustion chamber 20 in the vicinity of the compression TDC, and cooling loss in the expansion stroke can be reduced. Further, the thermal insulation film 34 in the circumferential region is formed to be thin, and therefore, in the intake stroke, the gas temperature in the combustion chamber 20 can be also restrained from increasing excessively, by the thin thermal insulation film 34. The reason of this is that the thermal capacity is smaller in the thin portion of the thermal insulation film 34 as compared with the thick portion of the thermal insulation film 34, an amount of heat that is received from the combustion gas in the expansion and exhaust strokes becomes relatively small, and therefore, the amount of heat which is given to the mixture gas in the subsequent intake stroke also becomes small. Accordingly, charge efficiency can be favorably restrained from being reduced by the gas flowing into the combustion chamber 20 being heated in the intake stroke.

Incidentally, in the above described Embodiment 1, the thermal insulation film 34 is formed from an anodized aluminum coating film. However, the thermal insulation film 34 may be formed from a sprayed coating film which is obtained by thermal spraying of a metal (for example, zirconia, titanium, manganese, iron) having a thermal conductivity lower than the base material of the cylinder head 18. The sprayed coating film has air bubbles formed in the process of formation within the coating film, and realizes a thermal capacity per unit volume which is lower than that of the base material of the cylinder head 18, due to a structure like this. Furthermore, a thermal insulation material having a thermal conductivity lower than the base material of the cylinder head 18 and having a low thermal capacity per unit volume can be used in place of the anodized aluminum coating film. The present modification can be similarly applied to an embodiment that will be described later.

Further, in Embodiment 1 described above, the internal combustion engine 10 is a compression ignition type engine. However, the engine to which the present invention can be applied is not limited to a compression ignition type engine. FIG. 9 is a view of a bottom surface of a cylinder head of a spark-ignition type engine seen from a top surface side of a piston. Similarly to the piston 14 shown in FIG. 1, a cavity and a circumferential edge portion are formed on the top surface of the piston. A thermal insulation film 40 shown in FIG. 9 has different film thicknesses in a cavity region and a circumferential region, similarly to the thermal insulation film 34 shown in FIG. 2. More specifically, the thermal insulation film 40 in a region (a cavity region) of the cylinder head 42 facing the cavity is formed to be thicker than the thermal insulation film 40 in a region (a circumferential region) of the cylinder head 42 facing the cavity. Like this, the present invention can be applied to any internal combustion engine that has a piston where a cavity and a circumferential edge portion are formed on the top surface similarly to Embodiment 1 described above. The present modification can be similarly applied in the embodiment which will be described later.

Embodiment 2

Next, Embodiment 2 of the present invention will be described with reference to FIG. 10. A feature of Embodiment 2 lies in that the thermal insulation film 34 is formed not only on the bottom surface of the cylinder head 18 but also on the top surface of the piston 14. Accordingly, the feature will be mainly described hereinafter.

FIG. 10 is a schematic vertical sectional view of a combustion chamber of an internal combustion engine of Embodiment 2. As shown in FIG. 10, the thermal insulation film 34 is formed on the top surface of the piston 14. Surface roughness of the thermal insulation film 34 in the cavity 22 and the circumferential edge portion 24 is made equivalent to the surface roughness of the thermal insulation film 34 in the circumferential region (equal to or smaller than 3 μm on average). Further, the thermal insulation film 34 in the cavity 22 is formed to be thicker than the thermal insulation film 34 in the circumferential edge portion 24. From the viewpoint of making heat insulating property in a periphery of the cavity 22 uniform, a film thickness of the thermal insulation film 34 in the cavity 22 is preferably equivalent to a film thickness of the thermal insulation film 34 in the cavity region. Likewise, from the viewpoint of making the heat insulating property in the circumferential edge portion 24 uniform, the film thickness of the thermal insulation film 34 in the circumferential edge portion 24 is preferably equivalent to the film thickness of the thermal insulation film in the circumferential region. The surface roughness and the film thickness of the thermal insulation film 34 which is formed in the cavity 22 and the circumferential edge portion 24 are regulated by polishing an anodized aluminum coating film as in the circumferential region.

According to Embodiment 2, an effect as follows is provided, in addition to the effect described in Embodiment 1 described above. First of all, in Embodiment 2, the thermal insulation film 34 is formed on the top surface of the piston 14, and therefore, the heat insulating property in the combustion chamber 20 can be enhanced as compared with Embodiment 1.

Further, in Embodiment 2, the surface of the thermal insulation film 34 in the circumferential edge portion 24 is polished to obtain surface roughness equivalent to the surface roughness of the thermal insulation film 34 in the circumferential region, and therefore, flowability of a mixture gas can be enhanced by enhancing a squish flow velocity. Therefore, reduction of combustibility accompanying reduction in flowability of the mixture gas can be restrained.

Further, in Embodiment 2, the surface of the thermal insulation film 34 in the cavity 22 is polished to obtain surface roughness equivalent to the surface roughness of the thermal insulation film 34 in the circumferential region, and therefore, flowability of a flame in the cavity 22 can be enhanced. Further, the surface of the thermal insulation film 34 in the circumferential edge portion 24 is polished to obtain the surface roughness equivalent to the surface roughness of the thermal insulation film 34 in the circumferential region, and therefore, flowability of a flame can be enhanced by enhancing an inverse squish flow velocity. Therefore, reduction of combustion efficiency accompanying reduction in flowability of a flame can be restrained.

Further, in Embodiment 2, the thermal insulation film 34 in the cavity 22 is formed to be thick. Therefore, the maximum temperature of the combustion gas is sufficiently increased in the vicinity of the compression TDC, and cooling loss in the expansion stroke can be reduced. Further, the thermal insulation film 34 in the circumferential edge portion 24 is formed to be thin, and therefore, the gas temperature in the combustion chamber 20 can be also restrained from increasing excessively in the intake stroke. The reason of this is similar to the reason why the thermal insulation film 34 in the circumferential region is formed to be thin. Accordingly, the charging efficiency can be favorably restrained from being reduced by the gas flowing into the combustion chamber 20 being heated in the intake stroke.

REFERENCE SIGNS LIST

10 internal combustion engine
12 cylinder
14 piston
18, 42 cylinder head
20 combustion chamber
22 cavity
24 circumferential edge portion
34, 40 thermal insulation film

The invention claimed is:

1. An internal combustion engine including a top surface of a piston, on which a cavity is formed, and a bottom surface of a cylinder head that configures a combustion chamber together with the top surface of the piston, and has a thermal insulation film, which has a lower thermal conductivity and a lower thermal capacity per unit volume than a base material, formed thereon,
   wherein the bottom surface of the cylinder head includes a cavity region and a circumferential region, both of which configure the combustion chamber, wherein the cavity region faces the cavity on the piston and the circumferential region configures a squish area in a circumferential edge of the cavity region, and
   wherein an arithmetic mean roughness of the thermal insulation film across the circumferential region is formed to be smaller than an arithmetic mean roughness of the thermal insulation film across the cavity region.

2. The internal combustion engine according to claim 1, wherein a film thickness of the thermal insulation film in the circumferential region is formed to be thinner than a film thickness of the thermal insulation film in the cavity region.

3. The internal combustion engine according to claim 1, wherein the film thickness of the thermal insulation film in the circumferential region is formed to change continuously in a connection portion with the cavity region, and become thinner with increasing distance from the cavity region.

4. The internal combustion engine according to claim 1, wherein on the top surface of the piston, a thermal insulation film that has a lower thermal conductivity and a lower thermal capacity per unit volume than a piston base material is formed, and
an arithmetic mean roughness of the thermal insulation film across the top surface of the piston is formed to be equivalent to the arithmetic mean roughness of the thermal insulation film across the circumferential region.

5. The internal combustion engine according to claim 4, wherein a film thickness of the thermal insulation film in a circumferential edge of the cavity is formed to be thinner than a film thickness of the thermal insulation film in the cavity.

* * * * *